United States Patent [19]

Morohashi

[11] Patent Number: 4,849,676
[45] Date of Patent: Jul. 18, 1989

[54] COLOR IMAGE DISPLAY TUBE APPARATUS

[75] Inventor: Katsuei Morohashi, Saitama, Japan

[73] Assignee: Kabushiki Kaisha Toshiba, Kawasaki, Japan

[21] Appl. No.: 134,509

[22] Filed: Dec. 16, 1987

[30] Foreign Application Priority Data

Dec. 17, 1986 [JP] Japan .................. 61-298961

[51] Int. Cl.⁴ ............................................. H01J 29/70
[52] U.S. Cl. ............................................. 315/368
[58] Field of Search ........................................ 315/368

[56] References Cited

U.S. PATENT DOCUMENTS

| | | | |
|---|---|---|---|
| 4,401,922 | 8/1983 | Kamata et al. | 315/368 |
| 4,500,816 | 2/1985 | Murphy | 315/368 |
| 4,620,136 | 10/1986 | Bolger | 315/368 |
| 4,672,275 | 6/1987 | Ando | 315/368 |
| 4,673,847 | 6/1987 | Louie et al. | 315/368 |
| 4,680,510 | 7/1987 | Spieth et al. | 315/368 |
| 4,687,973 | 8/1987 | Holmes et al. | 315/368 |

FOREIGN PATENT DOCUMENTS

| | | |
|---|---|---|
| 0162123 | 11/1985 | European Pat. Off. . |
| 2186794 | 11/1974 | France . |
| 51-46573 | 12/1976 | Japan . |
| 53-1014 | 1/1978 | Japan . |
| 54-29227 | 9/1979 | Japan . |

OTHER PUBLICATIONS

Patent Abstracts of Japan, vol. 6, No. 254 (E-148) [1132], Dec. 14, 1982; & JP-A-57 152 288 (Hitachi Seisakusho K.K.) 02-09-1982.

Primary Examiner—Thomas H. Tarcza
Assistant Examiner—David Cain
Attorney, Agent, or Firm—Cushman, Darby & Cushman

[57] ABSTRACT

Of three electron beams produced by an in-line type color cathode ray tube having a deflection device for producing uniform vertical and horizontal deflection fields, two beams are driven by G and B image signals that are delayed by CCDs in accordance with beam deflection positions on a fluorescent screen, so as to converge with the remaining one electron beam. A horizontal sync signal is also delayed by a CCD to remove a grid image deformation in accordance with the beam deflection positions. The amount of this delay is attained by reading out delay data stored in advance in a memory and supplying the delay data to a counter which are driven by horizontal and vertical deflection signals. An address decoder is provided to decode the contents of the counter to access the memory.

11 Claims, 9 Drawing Sheets

COLOR IMAGE DISPLAY TUBE APPARATUS

BACKGROUND OF THE INVENTION

The present invention relates to a color image display tube apparatus, and, in particular, to a color image tube apparatus which improves deformation of an electron beam shape and deformation of a grid image pattern by controlling a deflection magnetic field.

Figure 1:
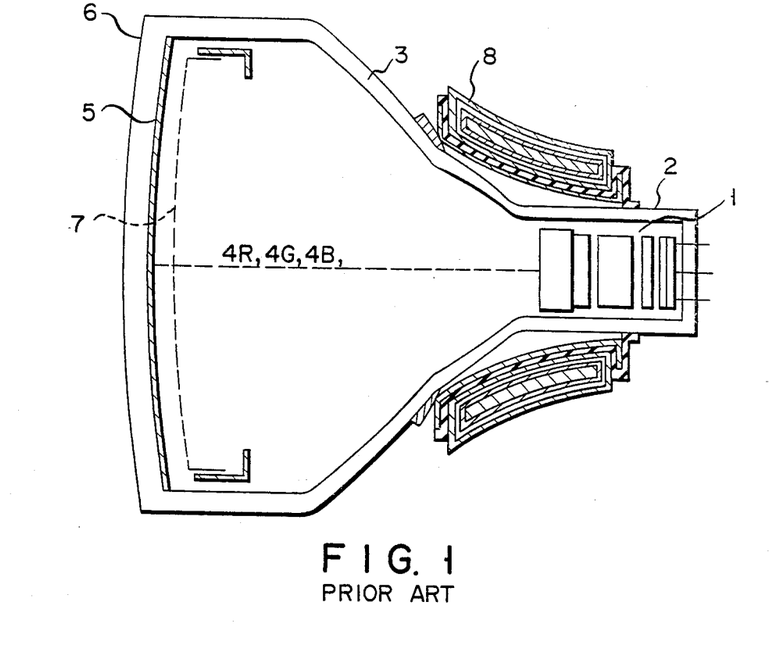
FIG. 1 is a diagram illustrating the structure of a conventional color image display tube.

A conventional shadow mask in-line type color image display tube apparatus, as shown in FIG. 1, comprises a neck 2 having three electron guns 1 disposed therein horizontally in an in-line form, a face plate 6, which is coupled through a funnel 3 to the neck 2 and has a fluorescent screen 5 with fluorescent layers adhered to the inner surface thereof in such a specific manner that the layers provide three colors, red, green and blue, when hit upon by electron beams 4R, 4G and 4B from the respective electron guns 1, a shadow mask 7 disposed close to the face plate 6 and having a plurality of openings through which the electron beams 4R, 4G and 4B selectively hit on the associated fluorescent layers, and a deflection device 8, which is mounted on the outer wall of the funnel 3 and generates horizontal and vertical deflection fields to deflect the electron beams in horizontal and vertical directions, respectively. In this type of color image display tube, there are various methods known to converge each of the three electron beams on one point on the fluorescent screen.

One of the methods produces deflection fields called self-concentration type fields, which are horizontal and vertical deflection fields respectively formed in pincushion and barrel shapes. Accordingly, this method can provide good convergence of the electron beams nearly over the entire fluorescent screen without using other specific beam-converging means. According to this method, however, since the horizontal and vertical deflection fields are not uniformly formed, the electron beams would have a deflection-originated deformation, thus deforming a displayed image.

Another method, as disclosed in Japanese Patent Application Publication Nos. 53-1014 and 54-292273, causes the electron beams from the electron guns to be mutually parallel to one another and provides the three color image signals corresponding to the three electron beams with mutual delays, thereby converging the three electron beams. This process will be explained referring to FIGS. 2A and 2B.

Figure 2A:
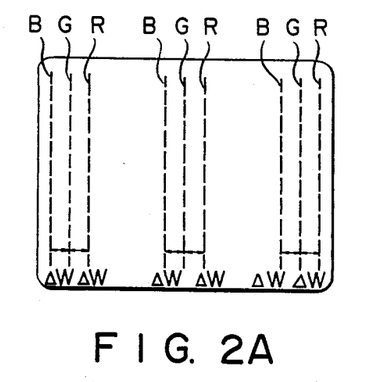
FIGS. 2A and 2B are diagrams illustrating how three electron beams are converged according to the conventional display tube.

FIG. 2A illustrates the positions on the fluorescent screen on which the electron beams hit with the image signals given with no time delays, using three vertical broken lines as one set for three colors. In this case, the three electron beams would have a mutual positional deviation of $\Delta W$ on the fluorescent screen.

Figure 2B:
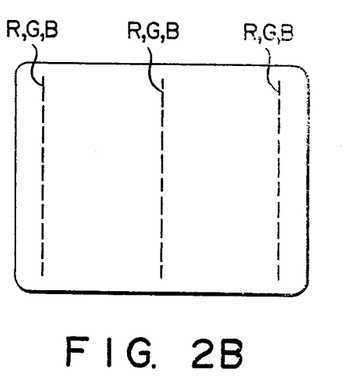

FIG. 2B illustrates the convergence of the three electron beams with the G and B image signals given with predetermined delays. More specifically, the G signal is given with a delay of $\Delta W$ and the B signal is given with a delay of $2\Delta W$ to be in line with the R signal.

According to this method, the convergence is high and the horizontal and vertical deflection fields have more uniform shapes than the self-concentration type fields explained with regard to the first method, thus providing a little improvement to the deflection-originated deformation of the electron beams.

However, the image deformation caused by this deflection-originated deformation of the electron beams according to this method is still not negligible from a practical point of view.

Figure 3A:
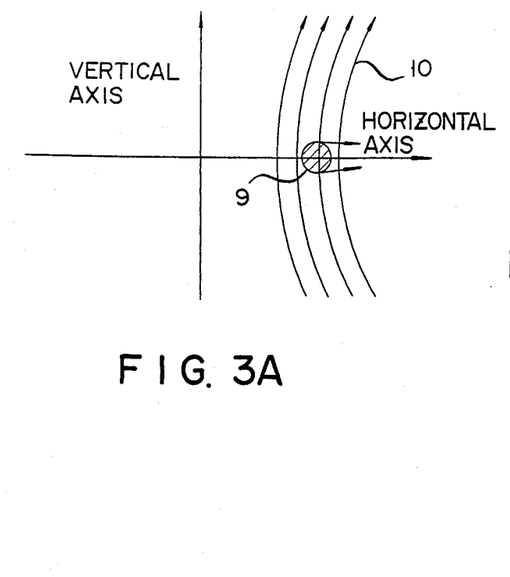
FIGS. 3A and 4A are diagrams illustrating the influence of horizontal and vertical deflection fields on electron beams, respectively.
Figure 3B:
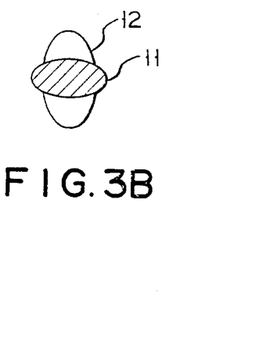
FIGS. 3B and 4B are diagrams each illustrating the state of a spot of an electron beam on a fluorescent screen according to prior art.

FIG. 3A illustrates that an electron beam 9 horizontally deflected by the above conventional method is affected by the arrow direction influence by a horizontal deflection field 10. As a result, as shown in FIG. 3B, a spot displayed on the screen by the horizontally-deflected electron beam would have a horizontally-elongated bright core section 11 and a dark halo section 12 elongated in the vertical direction.

Figure 4A:
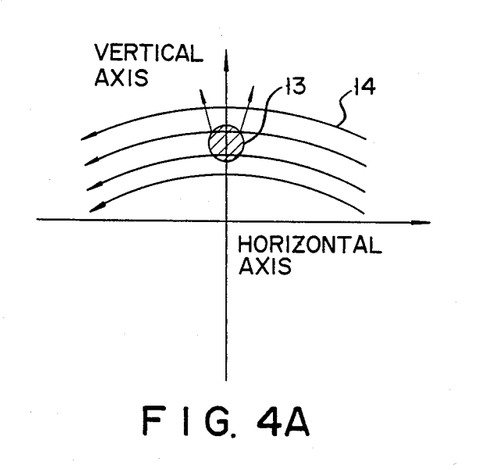
Figure 4B:
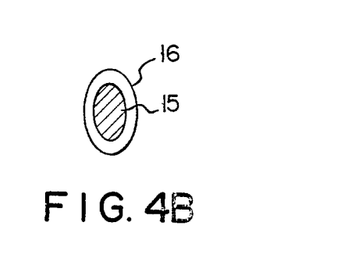

Similarly, FIG. 4A illustrates that an electron beam 13 vertically deflected is affected by the arrow direction influence by a vertical deflection field 14. As shown in FIG. 4B, a spot displayed on the screen by the vertically-deflected electron beam would have a vertically-elongated bright core section 15 and a dark halo section 16, which surrounds the core section 15 and is elongated in the vertical direction.

Figure 5:
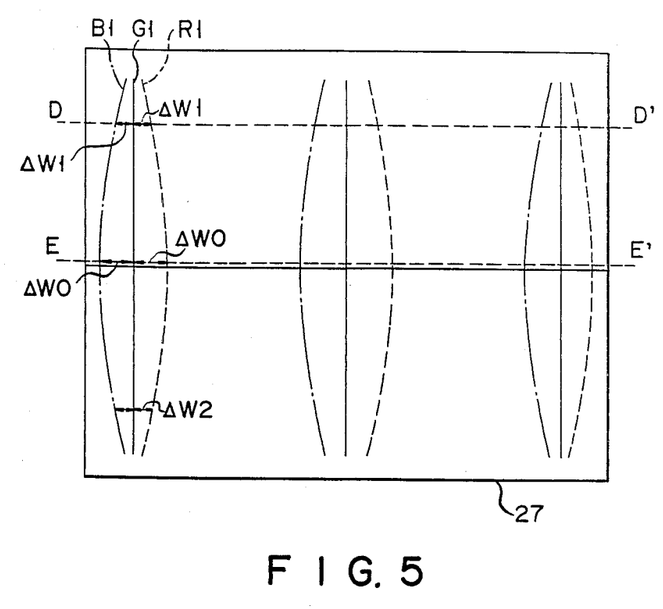
FIGS. 5 and 6 are diagrams exemplifying image deformation according to prior art.

To eliminate the cross-sectional deformation of the electron beam, the horizontal and vertical field may further be shaped more uniformly. With this measure, however, the beam convergence would be deteriorated. Further, in this case, as shown in FIG. 5, since the amount of the positional deviations of the three electron beams B1, G1, R1 on the fluorescent screen differ particularly depending on the vertical deflection positions, the mutual delays between the image signals for attaining the convergence should be changed according to the vertical deflection positions. In this case, of a set of three electron beams R1, G1, B1, for example, the beam R1 that is positioned last in the horizontal scanning direction (i.e., on the right edge side of the screen) is used as a reference beam and the remaining beams B1 and G1 are given with delays. For example, at a horizontal scanning position D-D', the beams B1 and G1 are given with delays of $2\Delta W_1$ and $\Delta W_1$, respectively, and at a horizontal scanning position E-E', the beams B1 and G1 are given with delays of $2\Delta W_0$ and $\Delta W_0$, respectively. This eliminates the mutual positional deviation of the three electron beams so as to improve the beam convergence.

Figure 6:
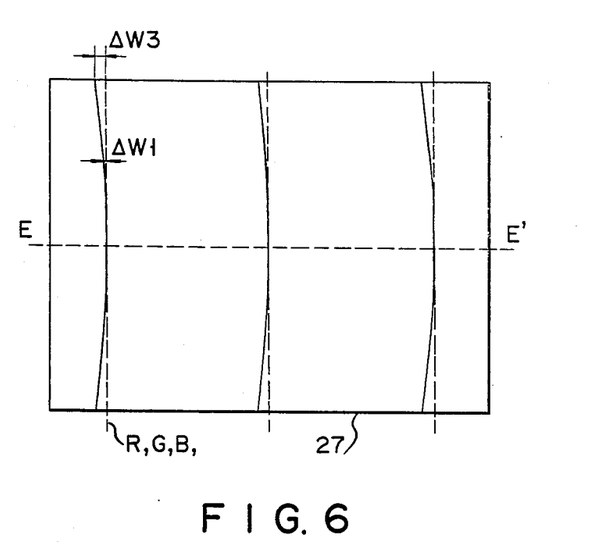

Even with the use of this method, however, an image may still be deformed. FIG. 6 is given for explaining how the image deformation occurs; vertical lines of grid patterns appearing on the fluorescent screen would be slightly curved in a bow shape, as indicated by the solid lines with respect to reference grid images indicated by the broken lines. This means that a straight line-shaped object would be displayed on the screen in the curved or bow shape, and is crucial to image display tube apparatuses.

As explained above, although the conventional methods, when used to converge three electron beams, can improve the deformation of the electron beams, the improvement is not sufficient yet. In addition, the improvement of the convergence and deformation of the electron beams according to the conventional methods results in a deformation in a grid image.

SUMMARY OF THE INVENTION

With the above in mind, therefore, it is an object of this invention to provide a color image display tube apparatus, which improves the convergence characteristic of three electron beams and deformation of the beams as well as deformation of a grid image so as to provide a high-quality video image.

This invention is directed to a color image display tube apparatus, which comprises a neck having three electron guns disposed therein horizontally in an inline form, a face plate, which is coupled through a funnel to the neck and has a fluorescent screen with fluorescent layers adhered to the inner surface thereof in such a specific manner that the layers provide three colors, red, green and blue, when hit upon by electron beams from the respective electron guns, a shadow mask disposed close to the face plate and having a plurality of openings through which the electron beams selectively hit on the associated fluorescent layers, and a deflection device, which is mounted on the outer wall of the funnel and generates horizontal and vertical deflection fields to deflect the electron beams in horizontal and vertical directions, respectively.

According to this invention, the horizontal and vertical deflection fields are formed approximately uniformly, image signals to be applied to the electron guns for generating the three electron beams are given with mutual delays which are controlled in a specific manner, and the delays are changed in synchronism with horizontal and vertical sync signals. This invention is further characterized in that the horizontal sync signal of the horizontal deflection field is subjected to delay control in accordance with the deflection position of the electron beams. It is desirable that the three electron beams are mutually in parallel to one another.

Since this invention uses unique means for controlling an image signal and deflection fields, it is possible to realize a color image display tube apparatus, which can improve the convergence characteristic and deformation of three electron beams as well as deformation of a grid image, thus providing a high-quality video image.

DETAILED DESCRIPTION OF THE PREFERRED EMBODIMENTS

One embodiment of this invention will now be explained referring to the accompanying drawings.

Figure 7:
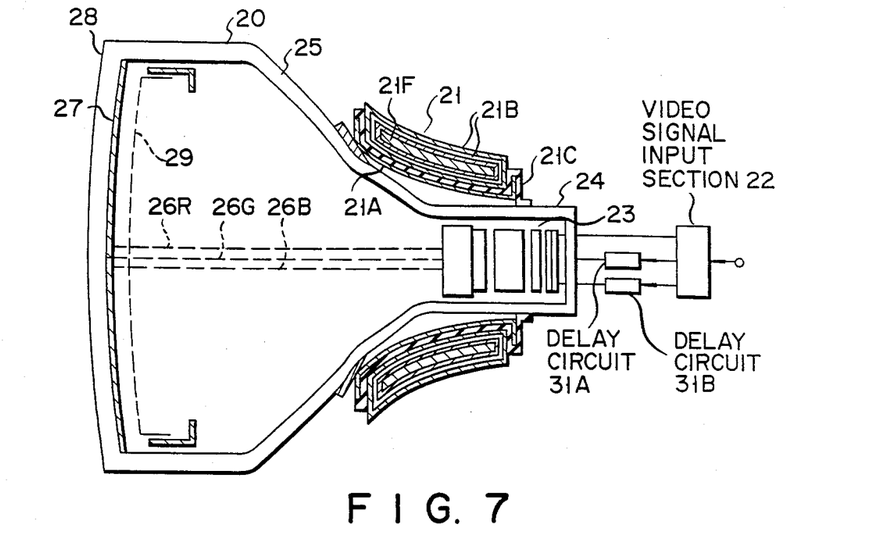
FIG. 7 is a diagram illustrating the structure of a color image display tube section of a color image display tube apparatus according to one embodiment of this invention.

FIG. 7 is a diagram for schematically explaining a color image display tube 20, a deflection device 21 and a video signal input section 22, which are used in a color image display tube apparatus according to this invention.

The color image display tube 20 of this invention has a neck portion 24 having electron guns 23 disposed therein horizontally in an in-line form, a face plate 28 coupled to the neck portion 24 through a funnel 25, and a shadow mask 29 disposed close to the inner surface of the face plate 28. The face plate 28 has a fluorescent screen 27 with fluorescent layers regularly adhered to the inner surface of the face plate 28 screen in such a manner that these layers provide three colors (red, green and blue) when hit upon by electron beams 26R, 26G and 26B emitted from electron guns 23. Shadow mask 29 has a plurality of openings through which electron beams 26R, 26G and 26B selectively hit on the associated fluorescent layers.

Electron guns 23 are designed such that the electron beams 26R, 26G and 26B are emitted parallel to one another in the horizontal direction; it is desirable that the interval between the electron beams should be about 4 to 8 mm.

Deflection device 21, mounted on the outer wall of funnel 25, has a horizontal deflection coil 21A for generating a uniform horizontal deflection field and a vertical deflection coil 21B for generating a uniform vertical deflection field. This deflection device has a well known structure, and is constituted by a combination of vertical deflection coil 21B wound twice on, for example, a ferrite core 21F in a toroidal form and horizontal deflection coil 21A wound in a saddle form and disposed inside the coil 21B with a separator 21C made of a resin being inserted therebetween. Instead of the saddle-toroidal type, a saddle-saddle type or a toroidal-toroidal type may be used as desired.

The shapes and sizes of the deflection coils should be selected so that the shapes of the generated deflection fields could cause an electron beam on the fluorescent screen to have a good shape. The deflection fields should most desirably be formed in an approximately uniform shape; however, the fields may be formed in a slightly non-uniform shape to balance the convergence characteristic and other characteristics.

The methods for producing a deflection field in a uniform shape, a pincushion shape and a barrel shape are well known. Example of these methods is explained in "Errors of Magnetic, Deflection, II" by J. Haantjs et al., Philips, Ris, Reports 14, 65-97, 1959.

Figure 8:
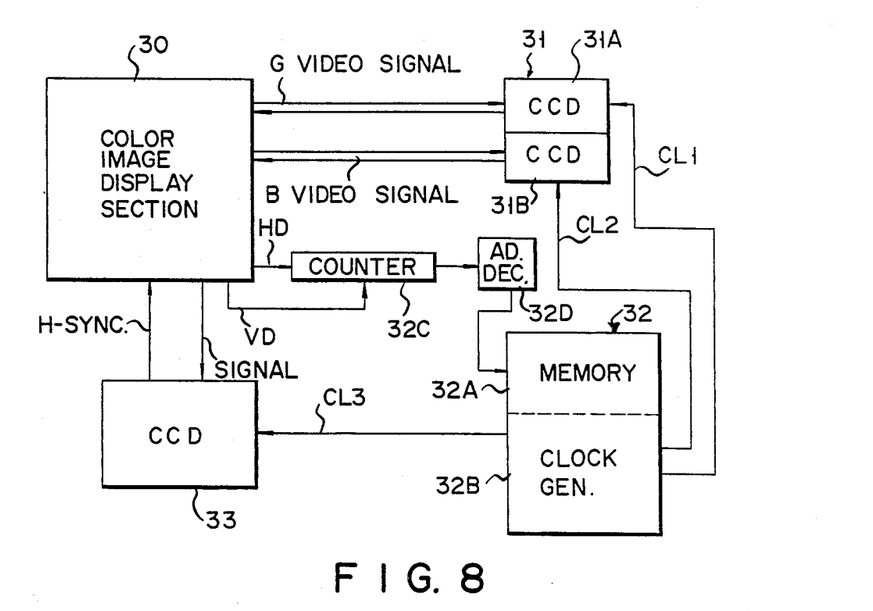
FIG. 8 is a block diagram of the overall constitution of this embodiment.

Referring now to FIG. 8, the overall constitution of a color image display tube apparatus according to the embodiment of this invention will be explained.

In FIG. 8, a color image display section 30 comprises, in addition to color image display tube 20, and deflection device 21 a power source circuit, a deflection amplifying section and other circuits (all not shown), and receives image signals such as G and B signals, which have been delayed by charge coupled devices (hereinafter referred to as CCDs) 31A and 31B serving as image delay circuits. A memory 32A and a clock generator 32B constitute a delay data generator 32, which outputs clocks corresponding to read delay data, to delay circuits CCDs 31A, 31B and 33. Memory 32A stores in advance delay data for delaying an image signal and a horizontal sync signal in accordance with the deflection position of an electron beam on the image screen. The content of the delay data is predetermined in accordance with the types of the color image display tube and the deflection device.

When the vertical deflection signal VD sent from the color image display section 30 is input to a counter 32C, the counter 32C is reset and starts counting the horizontal deflection signal HD. The output of the counter 32C is sent to an address decoder 32D to specify an address in memory 32A. As a result, delay data for correcting beam convergence, which has been stored in memory 32A in advance, is read out and is sent, via the clock generator 32B, to CCDs 31A and 31B or CCD 33 that serves as a horizontal sync delay circuit. In the case where delay elements such as a CCD and bucket brigade device (hereinafter referred to as a BBD), are used, clocks CL1 to CL3 for the delay elements are used as transfer signals for the image signals and the horizontal sync signal.

When the horizontal and vertical deflection signals HD and VD from color image display section 30 are input to counter 32C, the delay data is read out from memory 32A and delay clocks are output to CCDs 31A and 31B and CCD 33, which serve as the image delay circuit and the horizontal sync delay circuit, respectively. This delay data from memory 32A can be output in various forms, such as a voltage and a current, as will be described later.

Clock generator 32B generates a transfer clock of a frequency corresponding to the delay data from memory 32A and outputs it to horizontal sync delay circuit 33, which uses a CCD. In response to the transfer clock, horizontal sync delay circuit 33 outputs to image display section 30 a horizontal sync signal which is delayed in accordance with the deflection position of an electron beam. Similarly, transfer clocks CL1 and CL2 are supplied to CCDs 31A and 31B for delaying B and G image signals, respectively.

It should be understood from the above that according to the invention, electron beams are controlled on the basis of the image signals B and G, which have been delayed by predetermined time intervals in image delay circuits 31A and 31B, and the horizontal sync signal, which has been delayed by a predetermined time interval in horizontal sync delay circuit 33.

The embodiment of this invention will now be explained along the flow of a video signal.

Figure 9:
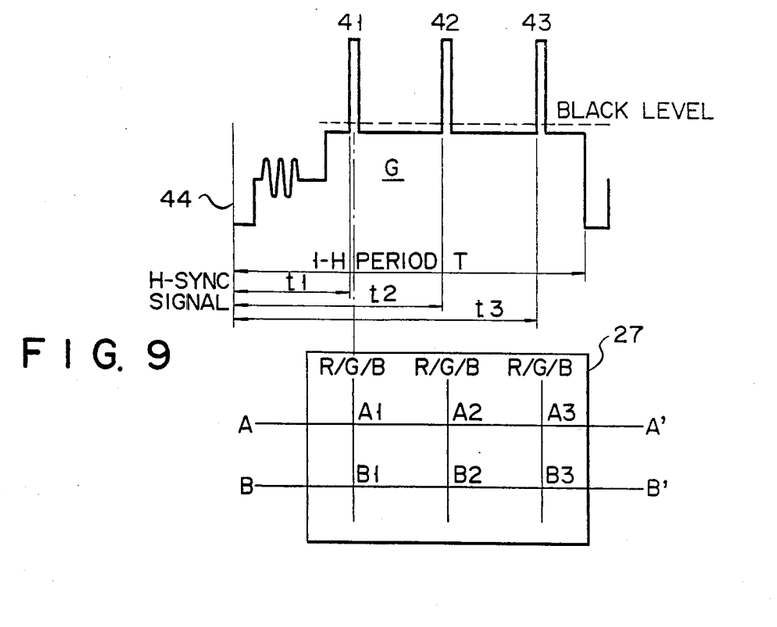
FIG. 9 is a diagram illustrating the relationship between an image signal on a video signal and an image on a fluorescent screen.
Figure 10:
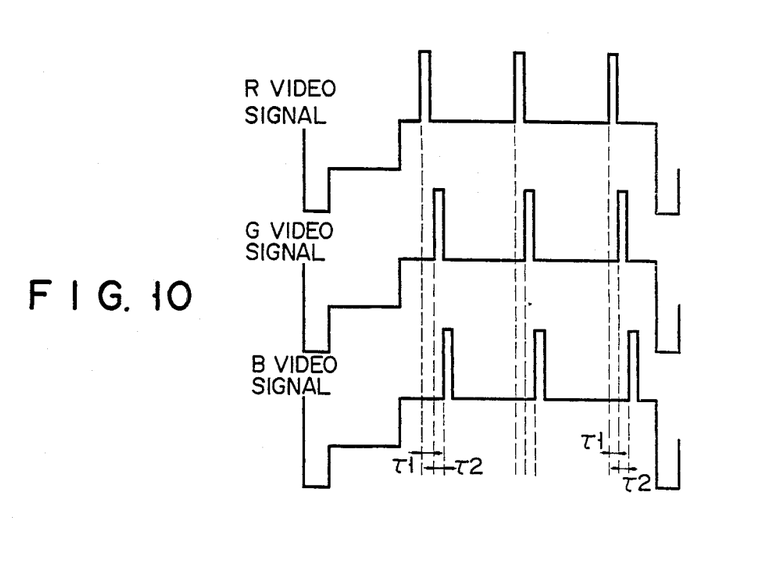
FIG. 10 is a timing chart for explaining delays of G and B signals with respect to an R signal.

FIG. 9 illustrates a video signal of the well-known NTSC system and a grid image formed by the video signal in correlation with each other. The video signal includes image signals 41, 42 and 43 each corresponding to the three electron beams, and a horizontal deflection sync signal 44 for synchronization of the horizontal deflection field.

An image corresponding to the image signals 41, 42 and 43 appears as a bright image on the fluorescent screen 27 at points A1, A2 and A3 when the beam scanning position is A-A' and at points B1, B2 and B3 when the beam scanning position is B-B'. A part of a grid image (vertical line) is provided by performing a vertical deflection of the electron beams while repeating this scanning.

In principle, a clear grid image with excellent beam convergence should be attained. According to this invention, however, since the deflection fields have a uniform or a nearly uniform shape, the three electron beams B, R and G would have a positional deviation and would hit, for example, on points B1, G1 and R1 on fluorescent screen 27, as shown in FIG. 5, unless no control measure is taken. To improve the convergence, therefore, the delay intervals of the image signals are controlled in accordance with the vertical and horizontal deflection positions of the beams in view of the amount of the deviation. More specifically, in FIG. 5, with the last beam R1 among the three electron beams in the scanning direction being used as a reference, the remaining beams B1 and G1 are given with delays using CCDs 31B and 31A of FIG. 8. For instance, at horizontal scanning position D-D' in FIG. 5, beams B1 and G1 are respectively given with delays of $2\Delta W_1$ and $\Delta W_1$, and at horizontal scanning position E-E', these beams B1 and G1 are respectively given with delays of $2\Delta W_0$ and $\Delta W_0$. Data about these delays is stored in memory 32A.

According to this embodiment, when a video signal G as shown, for example, in FIG. 9 is input to image delay circuit 31A of FIG. 8, an image signal G is output, which is subjected to a delay control in accordance with the delay data from memory 32A which stores data, such as the amount of convergence deviations ($\Delta W_0$ and $\Delta W_1$) corresponding to the deflection positions of the electron beams.

The image signals G and B are subjected to a delay control in CCD 31A and CCD 31B, respectively, to have delays of $\tau_1$ and $\tau_2$, respectively, with respect to the image signal R. The delays $\tau_1$ and $\tau_2$ are determined naturally in accordance with the amount of convergence deviations ($\Delta W_1$ and $\Delta W_2$); they should desirably be 0.1 to 3 microseconds. The delays $\tau_1$ and $\tau_2$ may equal or differ from each other.

With this control alone, the electron beam deformation is eliminated and the convergence characteristic is improved; however, in this case the grid image would be deformed or remained uncorrected to be a bow shape by the amount of $\Delta W_3$ as shown in the solid lines, for example, at the vertical deflection edge portion and $\Delta W_1$ at an intermediate portion between the center axis E-E' and vertical deflection edge portion, as shown in FIG. 6.

To eliminate this deformation, according to this invention, the sync signal for the horizontal deflection field is also controlled in accordance with the beam deflection positions. This control will be explained below with reference to FIG. 8. Memory 32A stores in advance data prepared on the basis of the relationship between the beam deflection positions and the amount of an image deformed. Horizontal deflection signal HD and vertical deflection signal VD extracted based on a video signal are input to counter 32C, and clock signal CL3 having a frequency corresponding to the delay data stored in memory 32A, is output to horizontal sync delay circuit 33 constituted by a CCD. Horizontal sync delay circuit 33 produces a horizontal sync signal delayed on the basis of the clock signal CL3, and then outputs the delayed sync signal to color image display section 30.

Figure 11:
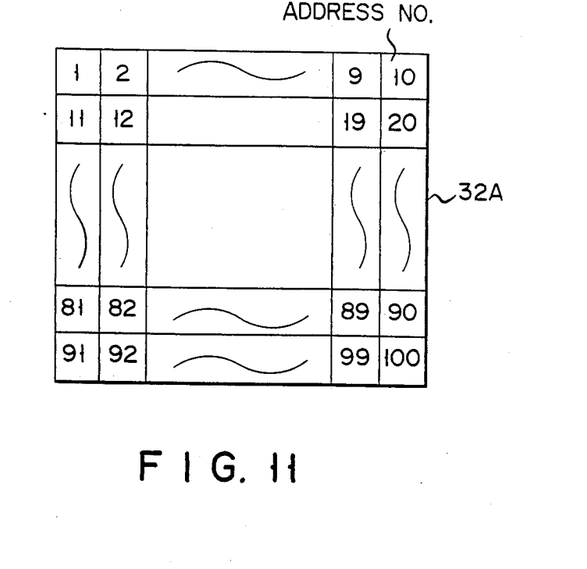
FIG. 11 is a diagram illustrating address numbers in a memory in which delay data is stored.
Figure 12:
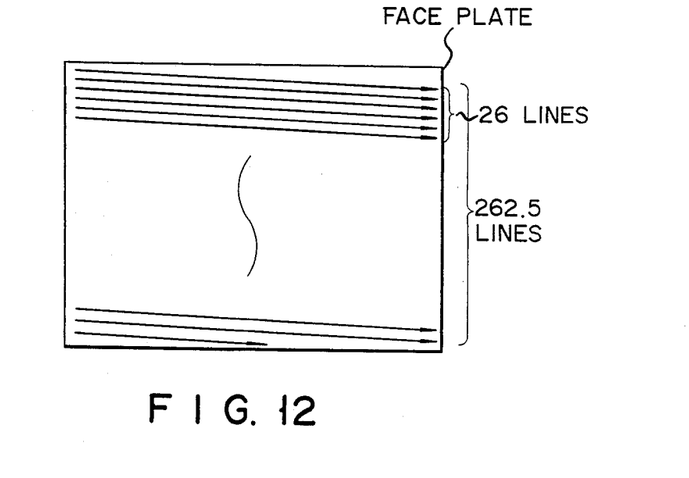
FIG. 12 is a diagram illustrating horizontal scanning lines on a face plate.

Each item of the data stored in memory 32A is given with an address number (1-100), as shown in FIG. 11, and it is desirable that the data should be sequentially read out in the order of the address numbers by address decoder 32D, using the content of counter 32C. According to the embodiment of this invention, the image display screen is divided into 100 sections, 10 in each of the vertical and horizontal directions, and are given with address numbers 1 to 100. In this example, the upper left section of face plate 28 where the beam scanning starts is given with address number 1 and the lower right section where the beam scanning ends is given with address number 100. The address numbers of memory 32A are set sequentially from 1, 2, . . . , 100 by address decoder 32D in accordance with the horizontal deflection signal HD after counter 32C is reset to 1 by the vertical deflection signal VD. In the case in which an image of the NTSC system is used, one frame is constituted by 262.5 horizontal scanning lines. As shown in FIG. 12, therefore, according to this embodiment, during about 26 horizontal scans the address number is sequentially set from 1 to 10 by the individual horizontal deflect signals from color image display section 30 and is then reset to 1. When the content of counter 32C becomes 27, address number 11 is designated by address decoder 32D. Of course, if the PAL or SECAM system is used instead of the NTSC system, almost the same addressing can be used although some modifications would be necessary because the total number of the scanning lines in the PAL or SECAM system differs from that of the NTSC system. All of 262.5 scanning lines are not displayed on the screen and the scanning is conducted to cover a region with several % greater than the screen and the vertical and horizontal retrace times, so that the total displayed scanning lines would be slightly smaller than 262.5. Accordingly, the aforementioned value, 26, as the number of scans, becomes smaller, so that this value needs to be determined as required.

According to this embodiment, the address number is set to 11 from 10 by the 27th horizontal sync signal and from this sync signal until the 52nd horizontal sync signal, the address numbers 11 to 20 are set. The address numbers set would increase in the above manner, and the address number is reset to 1 from 100 by the second vertical scanning signal and the above scanning operation is repeated.

Figure 13:
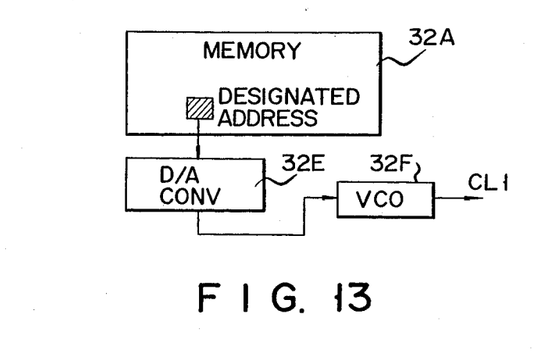
FIG. 13 is a block diagram illustrating the structure of a delay data generator shown in FIG. 8.
Figure 14:
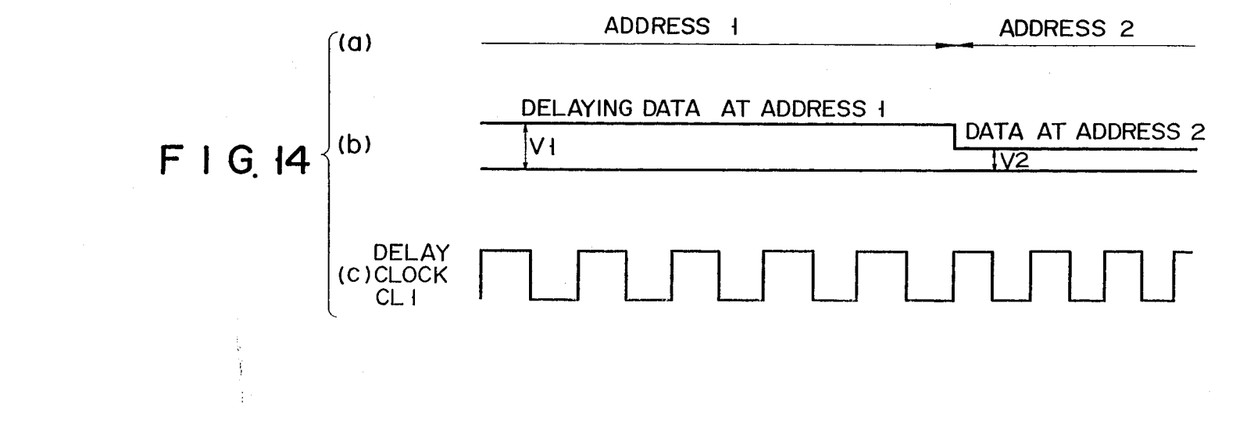
FIG. 14 is a timing chart illustrating the operation of the generator shown in FIG. 13.

Image delay circuit 31 and horizontal sync delay circuit 33 may preferably be constituted by a BBD in place of a CCD. As shown in FIG. 13, the delay data of address 1 read from memory 32A is converted by a D/A converter 32E into a voltage V1 as shown in FIG. 14(b) which is subjected to generate a corresponding frequency signal in a VCO (voltage controlled oscillator) 32F. VCO 32F produces delay clock CL1 that has a modulated frequency corresponding to the voltage V1. When the voltage V1 at address 1 becomes V2 at address 2 in FIG. 14, the frequency of clock CL1 changes as shown in FIG. 14(c) and the amount of a delay of the G signal changes in CCD 31A.

What is shown in FIG. 13 is a circuit for generating clock CL1, and similar circuits can be used to generate clocks CL2 and CL3. Since there are three delay circuits according to this embodiment, the number of the above clock generating circuits should also be three. However, if image delay circuit 31 and horizontal sync delay circuit 33 have the same delay, a single delay circuit ma be used for these two circuits.

Figure 15:
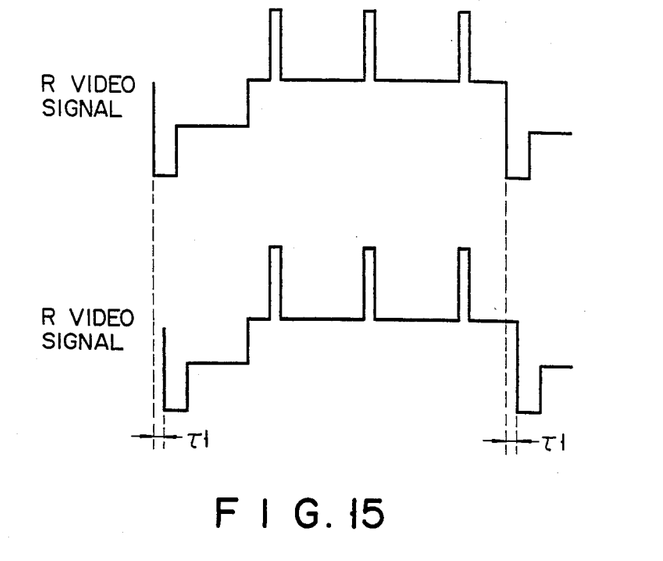
FIGS. 15 and 16 are timing charts illustrating the operation of the apparatus shown in FIG. 8.
Figure 16:
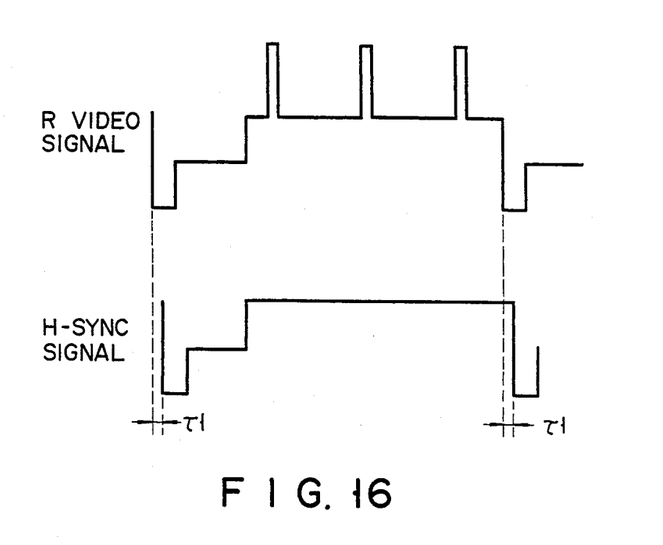

FIGS. 15 and 16 illustrate how the horizontal sync signal is delayed with respect to the R video signal. In the case of FIG. 16, the horizontal sync signal is delayed by $\tau_1$ with respect to the R video signal or the same delay the image signal in FIG. 15 has with respect to the R video signal. The delay should not necessarily be the same though. The delay time, which is determined in consideration of the amount of the grid image deformation, should desirably be 0.1-3 microseconds.

According to the embodiment shown in FIG. 7, since horizontal sync delay circuit 33 is provided separately from image delay circuit 31, only the horizontal sync signal which does not contain an image signal may be delayed as in the case shown in FIG. 16. The delay time for the horizontal sync signal is determined, as is the case in image delay circuit 31, by the delay data read from memory 32A which is subjected to address setting by the horizontal and vertical deflection signals from color image display section 30.

Since the horizontal sync signal as well as the image signal are delayed in the above manner, the time differences t1, t2 and t3 between the positions of the image signal (41, 42, 43) and the horizontal sync signal shown in FIG. 9 can be kept at constant even when the delay time for the image signal is changed. This provides an accurate image, not the deformed one as shown by broken lines in FIG. 6.

As the image signal and horizontal sync signal controlled in the above manner are sent to color image display section 30, an image attained by a color image display tube driven by these signals would be of a high quality as indicated by the broken lines in FIG. 6.

Figure 17A:
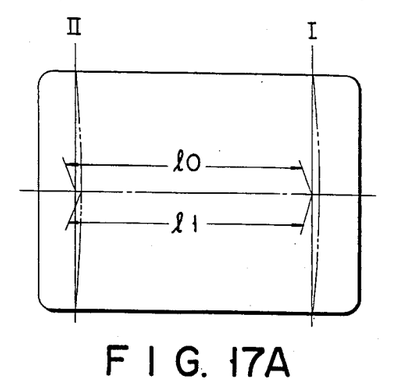
FIGS. 17A and 17B are diagrams comparatively illustrating displayed images attained by the embodiment of this invention and the conventional apparatus.
Figure 17B:
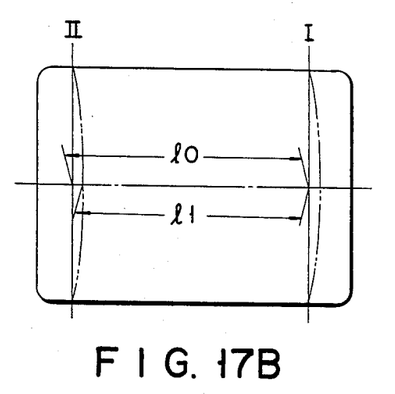

FIGS. 17A and 17B illustrate the quality of the grid image attained by the color image display tube apparatus according to this invention in comparison with that of the grid image attained by the conventional apparatus. FIG. 17A shows the grid image attained by this invention in which the horizontal sync signal is controlled, and FIG. 17B shows a comparative case where the horizontal sync signal is not controlled but the other conditions are same as those of this invention.

Provided that $l_0$ is the length between the reference lines I and II, $l_1$ is the length between the reference line I and the maximum extending point of the displayed image and the deformation $D=(l_0-l_1)l_0 \times 100$, the deformation in this invention of FIG. 17A is $D=1\%$ whereas the deformation in the comparative case of FIG. 17B is $D=4\%$.

Figure 18:
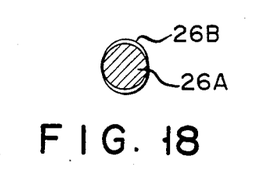
FIG. 18 is a cross-sectional view of an example of an electron beam according to this invention.

FIG. 18 illustrates the quality of the cross section of an electron beam which is deflected at the horizontal edge portion of the fluorescent screen of the color image display tube apparatus according to this invention. From FIG. 18, it should be clear that the electron beam has a high quality with a halo section 26B hardly noticeable and a core section 26A having a nearly circle shape.

The above embodiment has been explained with the case where the electron beams emitted from the electron guns are in parallel to one another. However, the beams may not be emitted in parallel to one another.

As should be understood from the above, this invention can realize a color image display tube apparatus which improves the convergence characteristic of three electron beams and deformation of the beams as well as deformation of a grid image so as to provide a high quality video image.

What is claimed is:

1. A color image display tube apparatus comprising:

a neck having three election guns disposed therein horizontally in an in-line form and parallel to one another, a face plate coupled through a funnel to said neck and having a fluorescent screen with fluorescent layers regularly adhered to an inner surface thereof as a to provide red, green and blue colors when hit upon by three electron beams emitted from said electron guns, a shadow mask disposed close to an inner surface of said face plate and having plurality of openings through which said three electron beams selectively hit on said fluorescent layers, a deflection device mounted on an outer wall of said funnel for generating horizontal and vertical deflection fields having an approximately uniform shape to deflect said three electron beams, means for applying image signals to said three electron guns that have mutually-controlled delay times that vary in synchronism with horizontal and vertical deflection signals, and means for controlling a horizontal sync signal for said horizontal deflection field in accordance with deflection positions of said electron beams.

2. The apparatus according to claim 1 wherein said means for applying image signals includes means for delaying two of said three electron beams that are positioned before the third electron beam in a horizontal scanning direction with predetermined delays in accordance with deflection positions on said face plate.

3. The apparatus according to claim 2, wherein said delay means includes:

a memory, addressed in synchronism with said horizontal and vertical deflection signals, for storing predetermined delay data at addresses corresponding to said deflection positions;

clock generating means for generating a clock with a frequency that varies in accordance with read-out delay data; and a charge coupled device, driven by said clock to transfer said image signals.

4. The apparatus according to claim 3, wherein said memory includes:

a counter that is reset by one vertical deflection signal and sequentially performs a count operation by said horizontal deflection signal; and an address decoder for decoding a content of said counter to generate an address signal for said memory.

5. The apparatus according to claim 3, wherein said clock generating means includes:

conversion means for converting said read-out delay data into an analog voltage signal; and a voltage controlled oscillator for generating a clock with a frequency corresponding to said voltage signal.

6. A color image display tube apparatus comprising:
means for displaying a color picture;
means for emitting three electron beams towards said display means;
means for generating horizontal and vertical deflection fields having an approximately uniform shape to cause deflection of said three electron beams;
means for applying image signals to said emitting means that have mutually controlled delay times that vary in synchronism with horizontal and vertical deflection signals; and
means for controlling a horizontal sync signal for said horizontal deflection fields in accordance with deflection positions of said electron beams.

7. An apparatus according to claim 6 wherein said emitting means emits said three electron beams in parallel.

8. The apparatus according to claim 1 wherein said means for applying image signals includes means for delaying two of said three electron beams that are positioned before the third electron beam in a horizontal scanning direction with predetermined delays in accordance with deflection positions on said displaying means.

9. The apparatus according to claim 2, wherein said delay means includes:

a memory, addressed in synchronism with said horizontal and vertical deflection signals, for storing predetermined delay data at addresses corresponding to said deflection positions;

clock generating means for generating a clock with a frequency that varies in accordance with read-out delay data; and a charge coupled device, driven by said clock to transfer said image signals.

10. The apparatus according to claim 3, wherein said memory includes:

a counter that is reset by one vertical deflection signal and sequentially performs a count operation by said horizontal deflection signal; and an address decoder for decoding a content of said counter to generate an address signal for said memory.

11. The apparatus according to claim 3, wherein said clock generating means includes:

conversion means for converting said read-out delay data into an analog voltage signal; and a voltage controlled oscillator for generating a clock with a frequency corresponding to said voltage signal.

* * * * *